United States Patent
Nakata et al.

(10) Patent No.: US 9,507,328 B2
(45) Date of Patent: Nov. 29, 2016

(54) PROCESSING CHAMBER ALLOCATION SETTING DEVICE AND PROCESSING CHAMBER ALLOCATION SETTING PROGRAM

(71) Applicant: Hitachi High-Technologies Corporation, Minato-ku, Tokyo (JP)

(72) Inventors: Teruo Nakata, Yokohama (JP); Keita Nogi, Tokyo (JP); Satomi Inoue, Kudamatsu (JP)

(73) Assignee: HITACHI HIGH-TECHNOLOGIES CORPORATION, Tokyo (JP)

( * ) Notice: Subject to any disclaimer, the term of this patent is extended or adjusted under 35 U.S.C. 154(b) by 695 days.

(21) Appl. No.: 13/859,812

(22) Filed: Apr. 10, 2013

(65) Prior Publication Data

US 2013/0274908 A1 Oct. 17, 2013

(30) Foreign Application Priority Data

Apr. 11, 2012 (JP) ................. 2012-089849

(51) Int. Cl.
G05B 15/02 (2006.01)
G05B 19/418 (2006.01)

(52) U.S. Cl.
CPC ......... *G05B 15/02* (2013.01); *G05B 19/41865* (2013.01); *G05B 2219/32328* (2013.01); *G05B 2219/45031* (2013.01); *Y02P 90/083* (2015.11); *Y02P 90/20* (2015.11); *Y02P 90/26* (2015.11); *Y02P 90/28* (2015.11)

(58) Field of Classification Search
None
See application file for complete search history.

(56) References Cited

U.S. PATENT DOCUMENTS 5,241,465 A * 8/1993 Oba ................... G06Q 10/0637
705/7.36

5,914,879 A * 6/1999 Wang ................. G05B 19/4184
700/111

(Continued)

FOREIGN PATENT DOCUMENTS

JP 2007-511104 4/2007
WO WO 2005/048313 A2 5/2005

OTHER PUBLICATIONS

Jun-Ho Lee; Tae-Eog Lee, "Concurrent processing of multiple wafer types in a single-armed cluster tool," in Automation Science and Engineering (CASE), 2011 IEEE Conference on, pp. 102-107, Aug. 24-27, 2011.*

(Continued)

*Primary Examiner* — Christopher E Everett
(74) *Attorney, Agent, or Firm* — Baker Botts L.L.P.

(57) ABSTRACT

Provided is a method that may quickly and simply select the allocation of the type of wafers to the processing chamber having a higher productivity in a semiconductor processing device in which a plurality of conveyance robots is disposed in a conveyance mechanism to which a processing chamber is connected and an object to be processed is delivered between the plurality of conveyance robots, when processings are performed on a plurality of types of wafers in parallel. From the information on the arrangement of the processing chambers of the semiconductor processing device and input type of wafers to be processed, the processing chamber allocation candidate is comprehensively generated and a simulation that manufactures all processing targets for each of the processing chamber allocation candidates is performed to calculate a productivity and the candidates are displayed in the order from a higher productivity to support the adoption of a user.

9 Claims, 15 Drawing Sheets

(56) References Cited

U.S. PATENT DOCUMENTS

| | | | | |
|---|---|---|---|---|
| 6,201,999 B1* | 3/2001 | Jevtic | G03F 7/70533 | 118/719 |
| 6,418,350 B1* | 7/2002 | Hamidzadeh | G05B 19/41865 | 700/100 |
| 6,519,498 B1* | 2/2003 | Jevtic | G05B 19/41865 | 700/100 |
| 6,580,955 B2* | 6/2003 | Lin | G06Q 10/06 | 29/25.01 |
| 6,999,831 B2* | 2/2006 | Hayashi | G05B 19/41865 | 700/101 |
| 7,460,920 B1* | 12/2008 | Qu | G05B 19/41885 | 700/100 |
| 7,769,482 B2* | 8/2010 | Pannese | G05B 15/02 | 700/108 |
| 8,483,861 B2* | 7/2013 | Schwarm | G05B 13/042 | 700/104 |
| 2005/0234578 A1* | 10/2005 | Liu | G05B 19/41865 | 700/100 |
| 2011/0144792 A1* | 6/2011 | Nakata | H01L 21/67184 | 700/112 |
| 2011/0217148 A1* | 9/2011 | Nakata | H01L 21/677 | 414/217 |
| 2011/0218662 A1* | 9/2011 | Nakata | G06F 19/00 | 700/112 |

OTHER PUBLICATIONS

H. Todd LeBaron and Mark Pool. 1994. The simulation of cluster tools: a new semiconductor manufacturing technology. In Proceedings of the 26th conference on Winter simulation (WSC '94), Mani S. Manivannan and Jeffrey D. Tew (Eds.). Society for Computer Simulation International, San Diego, CA, USA, 907-912.*

OpenOffice.org, Calc Guide: Using Spreadsheets in OpenOffice.org, Sep. 8, 2010.*

Mathias Dummler, Modeling and Optimization of Cluster Tools in Semiconductor Manufacturing, Dissertation for Universitat Wurzburg, Jan. 2004.*

Peter van der Meulen, Linear Semiconductor Manufacturing Logistics and the Impact on Cycle Time, BlueShift Technologies, Inc. 3 Riverside Drive, Andover, MA 01810. pvander@blueshifttech.com.

* cited by examiner

| TYPE OF WAFER | PROCESSING TIME | NUMBER OF PROCESSED WAFERS |
|---|---|---|
| WA | 30 | 500 |
| WB | 100 | 200 |

| PROCESSING CHAMBER ID |
|---|
| PROCESSING CHAMBER 107 |
| PROCESSING CHAMBER 108 |
| PROCESSING CHAMBER 111 |
| PROCESSING CHAMBER 112 |

| OPERATING PART | OPERATION CONTENTS | OPERATION PERFORMING CONDITION | OPERATION TIME |
|---|---|---|---|
| ATMOSPHERE ROBOT 104 | CONVEY WAFER FROM LOAD PORTS 101, 102, AND 103 TO LOAD LOCK 105 | THERE IS UNPROCESSED WAFER FOR WHICH PROCESSING CHAMBER ALLOCATED TO LOAD PORTS 101, 102, AND 103 IS WAITING<br>LOAD LOCK 105 HAS EMPTY SPACE AND IS AT ATMOSPHERIC PRESSURE<br>ATMOSPHERE ROBOT 104 IS IN WAITING STATUS | 5 |
| ATMOSPHERE ROBOT 104 | CONVEY WAFER FROM LOAD LOCK 105 TO LOAD PORTS 101, 102, AND 103 | LOAD LOCK 105 HAS UNPROCESSED WAFER AND IS IN ATMOSPHERIC PRESSURE STATUS<br>ATMOSPHERE ROBOT 104 IS IN WAITING STATUS | 5 |
| ATMOSPHERE ROBOT 105 | VACUUM | LOAD LOCK 105 HAS UNPROCESSED WAFER AND IS IN ATMOSPHERIC PRESSURE STATUS | 5 |
| ATMOSPHERE ROBOT 105 | VENT | LOAD LOCK 105 HAS UNPROCESSED WAFER AND IS IN VACUUM STATUS | 5 |
| VACUUM ROBOT 106 | CONVEY WAFER FROM LOAD LOCK 105 TO PROCESSING CHAMBERS 107 AND 108 | LOAD LOCK 105 HAS UNPROCESSED WAFER WHICH IS ALLOCATED TO PROCESSING CHAMBERS 107 AND 108 AND IS IN VACUUM STATUS<br>PROCESSING CHAMBERS 107 AND 108 ARE IN WAITING STATUS<br>VACUUM ROBOT 106 IS IN WAITING STATUS | 10 |
| VACUUM ROBOT 106 | CONVEY WAFER FROM LOAD LOCK 105 TO INTERMEDIATE CHAMBER 109 | LOAD LOCK 105 HAS UNPROCESSED WAFER WHICH IS ALLOCATED TO PROCESSING CHAMBERS 111 AND 112<br>INTERMEDIATE CHAMBER 109 HAS EMPTY SPACE<br>VACUUM ROBOT 106 IS IN WAITING STATUS | 5 |
| VACUUM ROBOT 110 | CONVEY WAFER FROM INTERMEDIATE CHAMBER 109 TO PROCESSING CHAMBERS 111 AND 112 | INTERMEDIATE CHAMBER 109 HAS UNPROCESSED WAFER WHICH IS ALLOCATED TO PROCESSING CHAMBERS 111 AND 112<br>PROCESSING CHAMBERS 111 AND 112 ARE IN WAITING STATUS<br>VACUUM ROBOT 106 IS IN WAITING STATUS | 10 |
| . . | . . | . . | . . |

| PROCESSING CHAMBER ALLOCATION NUMBER CANDIDATE No | TYPE OF WAFER | NUMBER OF ALLOCATED PROCESSING CHAMBERS |
|---|---|---|
| 1 | WA | 3 |
| 1 | WB | 1 |
| 2 | WA | 2 |
| 2 | WB | 2 |
| 3 | WA | 1 |
| 3 | WB | 3 |

409

| PROCESSING CHAMBER ALLOCATION CANDIDATE No | PROCESSING CHAMBER ID | | | | |
|---|---|---|---|---|---|
| | 107 | 108 | 111 | 112 | |
| 1-1 | WA | WA | WA | WB | —1501 |
| 1-2 | WB | WA | WA | WA | —1502 |
| 1-3 | WA | WB | WA | WA | —1503 |
| 1-4 | WA | WA | WB | WA | —1504 |
| 2-1 | WA | WA | WB | WB | —1505 |
| 2-2 | WB | WA | WA | WB | —1506 |
| 2-3 | WB | WA | WB | WA | —1507 |
| 2-4 | WA | WB | WA | WB | —1508 |
| 2-5 | WA | WB | WB | WA | —1509 |
| ⋮ | ⋮ | ⋮ | ⋮ | ⋮ | |

| PROCESSING CHAMBER ALLOCATION CANDIDATE No | PROCESSING COMPLETED TIME |
|---|---|
| 1-1 | 24600 |
| 1-2 | 22800 |
| . | . |
| . | . |
| . | . |
| 2-1 | 14800 |
| 2-2 | 13500 |
| . | . |
| . | . |
| . | . |
| 3-1 | 18500 |
| 3-2 | 17200 |
| . | . |
| . | . |
| . | . |

| PART | OPERATION | START TIME |
|---|---|---|
| ATMOSPHERE ROBOT 104 | CONVEY W1 (LOAD PORT → LOAD LOCK 105) | 0 |
| LOAD LOCK 105 | VACUUM | 5 |
| LOAD LOCK 105 | VENT | 10 |
| VACUUM ROBOT 106 | CONVEY W1 (LOAD LOCK 105 PROCESSING CHAMBER 1) | 10 |
| ATMOSPHERE ROBOT 104 | CONVEY W2 (LOAD PORT → LOAD LOCK 105) | 15 |
| LOAD LOCK 105 | VACUUM | 20 |
| PROCESSING CHAMBER 1 | PROCESSING | 20 |
| LOAD LOCK 105 | VENT | 25 |
| VACUUM ROBOT 106 | CONVEY W2 (LOAD LOCK 105 → INTERMEDIATE CHAMBER 109) | 25 |
| . | . | . |
| . | . | . |
| . | . | . |

PROCESSING CHAMBER ALLOCATION SETTING DEVICE AND PROCESSING CHAMBER ALLOCATION SETTING PROGRAM

CLAIM OF PRIORITY

The present application claims priority from Japanese application serial no. JP2012-089849, filed on Apr. 11, 2012, the content of which is hereby incorporated by reference into this application.

BACKGROUND OF THE INVENTION

1. Field of the Invention

The present invention relates to a processing chamber allocation setting device and a processing chamber allocation setting program which evaluate and set a type of processing which is performed in each of the processing chambers in a semiconductor processing apparatus including a plurality of processing chambers.

2. Description of the Related Art

In a semiconductor processing apparatus, particularly, an apparatus which processes a processing target in a depressurized device, improvement of a productivity in processing a semiconductor to be processed which is a processing target (hereinafter, referred to as a "wafer") is demanded together with the miniaturization and refinement of the processing. Accordingly, recently, a multi-chamber device in which a plurality of processing chambers is connected to one device is developed to improve the productivity per installation area of a clean room. In the device which includes a plurality of processing chambers to perform processing, each of the processing chambers is adjusted so as to reduce gas therein or a pressure thereof and is connected to a conveyance chamber which includes a robot for conveying the wafer.

As such a multi-chamber device, a device having a structure called as a cluster tool in which processing chambers are radially connected around the conveyance chamber is widely spread. However, the device of the cluster tool requires a larger installation area and has a problem in that the installation area is increased as a diameter of the wafer is increased in recent years. Therefore, in order to address the above-mentioned problem, a device having a structure called as a linear tool appeared (for example, see Japanese Unexamined Patent Application Publication No. 2007-511104). A characteristic of the linear tool is a structure that a plurality of conveyance chambers is provided, processing chambers are connected to the conveyance chambers, and the conveyance chambers are connected to each other directly or with a delivery space (hereinafter, referred to as an "intermediate chamber") interposed therebetween.

Since the multi-chamber device includes a plurality of processing chambers, different processings may be performed on a plurality of types of wafers in separate processing chambers in parallel. In order to perform parallel processing, a processing chamber in which a processing will be performed on each type of wafers is required to be set in advance. Therefore, the allocation of the type of wafer and the processing chamber (hereinafter, referred to as "processing chamber allocation") is set by a processing chamber setting device.

The processing chamber allocation is determined by evaluating a productivity or a compatibility of a type of wafer to be processed and the processing chamber. Specifically, in case of the linear tool, since a plurality of conveyance chambers is provided and the conveyance path or the conveyance sequence of the wafer is complex, if the processing chamber allocation is changed, the conveyance path or the conveyance sequence is changed so that the productivity may be significantly changed. Accordingly, in order to determine the processing chamber allocation in the linear tool, it is required to focus on the evaluation of the productivity.

There are some suggestions for evaluation of the productivity of the linear tool (for example, see Van Der Meulen: "Linear semiconductor manufacturing logistics and the impact on cycle time" (Advanced Semiconductor Manufacturing Conference, 2007, ASMC 2007, IEEE/SEMI, page 111-116) 11-12, Jun. 2007). The suggestions are to calculate the productivity based on a cycle time related with the conveying operation when the processing chamber allocation of the linear tool or the conveyance path of the wafer is given.

The above-described related technology has the following problems.

If a plurality of candidates is considered for the processing chamber allocation, it is desired to select a processing chamber allocation which may accomplish the best productivity. However, the related technology only calculates the productivity, but does not suggest a processing chamber allocation which may accomplish the best productivity, for given processing chamber allocation. Therefore, a person who determines the processing chamber allocation needs to repeat the trial and error to derive the processing chamber allocation having higher productivity. However, in a semiconductor processing device in which a large number of processing chambers are disposed in accordance with the increase in the productivity, since the number of candidates for processing chamber allocation is huge, it is difficult to derive the best processing chamber allocation by the trial and error. Therefore, the present invention relates to setting of the processing chamber allocation in the linear tool and provides a method capable of rapidly and simply selecting the best processing chamber allocation.

SUMMARY OF THE INVENTION

An aspect of the present invention has been made in an effort to provide a processing chamber allocation setting device which evaluates allocation of processing chambers and a type of object to be processed in advance in a semiconductor processing device having a structure in which a plurality of conveyance chambers is provided and the conveyance chambers are connected to the processing chambers while being connected to each other directly or with a delivery intermediate chamber of the object to be processed interposed therebetween, including: a processing chamber allocation candidate generating unit which calculates all processing chamber allocation number candidates which allocates at least one processing chamber to each type of objects to be processed, creates one processing chamber allocation candidate which allocates the type of object to be processed to each of the processing chambers in the processing chamber allocation number candidate, and replaces the type of allocated object to be processed of an arbitrary pair of processing chambers for the one processing chamber allocation candidate to search a new processing chamber allocation candidate to generate all combinations of processing chamber allocation candidates, and a processing completed time calculating unit which virtually reproduces a series of manufacturing processes, which conveys a processing target designated by a user in accordance with each of the processing chamber allocation candidates to a corresponding processing chamber of the semiconductor processing device to perform a predetermined processing, on a calculator, to calculate a processing completed time from an initial processing starting time of all objects to be processed which are processing targets to a processing completed time of the last object to be processed for every processing chamber allocation candidate.

Further, an aspect of the present invention has been made in an effort to provide a processing chamber allocation setting device, including a computing unit, a storing unit, an information input unit, a display unit, and a communication unit. The computing unit includes the processing chamber allocation candidate generating unit and the processing completed time calculating unit. The processing completed time calculating unit displays a calculated processing completed time for every processing chamber allocation candidate on the display unit in a descending order from the most quickly completed candidate to allow the user to receive the processing chamber allocation candidate selected through the information input unit, and simulates the series of manufacturing processes of all objects to be processed, which are processing targets, in accordance with the selected processing chamber allocation candidate, again to create operation schedule information of the target semiconductor processing device to transmit the selected processing chamber allocation and the operation schedule information to the semiconductor processing device through the communication unit.

In addition, an aspect of the present invention has been made in an effort to provide a processing chamber allocation setting program which, in order to evaluate allocation of processing chambers and a type of object to be processed in advance in a semiconductor processing device having a structure in which a plurality of conveyance chambers is provided and the conveyance chambers are connected to the processing chambers while being connected to each other directly or with a delivery intermediate chamber interposed therebetween, allows a computer to function as: a unit which calculates all processing chamber allocation number candidates which allocates at least one processing chamber to each type of objects to be processed based on processing target information input by a user and processible processing chamber information received from the semiconductor processing device, a unit which, in each of the processing chamber allocation number candidates, creates one processing chamber allocation candidate which allocates the type of object to be processed to each of the processing chambers, a unit which replaces the type of allocated object to be processed of an arbitrary pair of processing chambers for the one processing chamber allocation candidate to search a new processing chamber allocation candidate to generate all combinations of processing chamber allocation candidates; and a unit which uses operation rule and operation time information received from the semiconductor processing device to virtually reproduce a series of manufacturing processes, which conveys a processing target designated by a user in accordance with each of the processing chamber allocation candidates to a corresponding processing chamber of the semiconductor processing device to perform a predetermined processing, on a calculator to calculate a processing completed time from an initial processing starting time of all objects to be processed, which are processing targets, to a processing completed time of the last object to be processed for every processing chamber allocation candidate.

Furthermore, an aspect of the present invention has been made in an effort to provide a processing chamber allocation setting program which allows a computer to function as: a unit which displays a layout chart of a processing chamber of the semiconductor processing device on a display unit to display information on a type of object to be processed, which is allocated to each of the processing chambers as a result of the selection of a user from a list of a processing completed time of the processing chamber allocation candidate, on a chart of a corresponding processing chamber, and a unit which allows a user to designate and input information on a type of object to be processed, which a user wants to allocate, on a chart of the processing chamber to select only a combination of all processing chamber allocation candidates, which are specified to allocate the processing chamber designated by the user and the type of object to be processed, and the processing completed time to display the selected processing chamber allocation candidates in a descending order from the earliest processing completed time.

According to the aspects of the present invention, if a plurality of processings is preformed in parallel in a semiconductor processing device of a linear tool, it is possible to quickly and simply select allocation of a processing chamber having a higher productivity during the allocation of the plurality of processing chambers.

BRIEF DESCRIPTION OF THE DRAWINGS

FIG. 11 is a view illustrating an example of processing target information;

FIG. 12 is a view illustrating an example of processing chamber information;

FIG. 13 is a view illustrating an example of operation rule and operation time information;

FIG. 14 is a view illustrating an example of processing chamber allocation number candidate information;

FIG. 16 is a view illustrating an example of processing chamber allocation result information;

FIG. 18 is a view illustrating an example of operation schedule information.

DETAILED DESCRIPTION OF THE PREFERRED EMBODIMENTS

Figure 1:
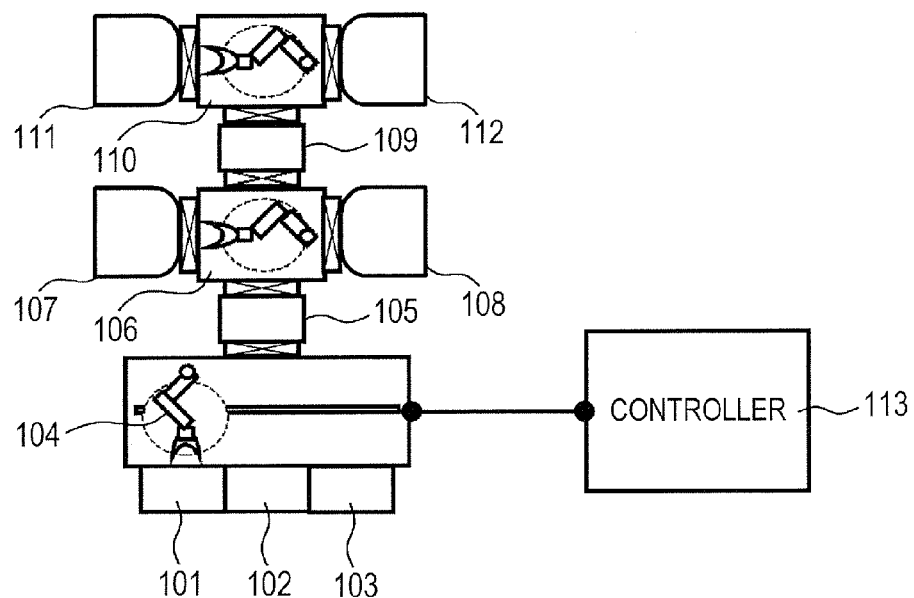
FIG. 1 is a view explaining a configuration of a semiconductor processing device of a linear tool.

Hereinafter, embodiments of the present invention will be described with reference to the drawings.

A configuration of a semiconductor processing device of a linear tool in which a processing chamber is set by the present invention will be described with reference to FIG. 1. The semiconductor processing device is mainly configured by a processing chamber which performs processing, a mechanical part including a conveyance mechanism which conveys a wafer, and a control part which performs control.

The mechanical part is configured by processing chambers 107, 108, 111, and 112, load ports 101, 102, and 103, a conveying robot in atmosphere (hereinafter, referred to as an "atmosphere robot") 104, a load lock 105, conveying robots in vacuum (hereinafter, referred to as a "vacuum robot") 106 and 110, and an intermediate chamber 109.

The load ports 101, 102, and 103 are tables on which a cassette in which a wafer to be processed is accommodated is disposed.

The atmosphere robot 104 includes an extensible arm and a hand which may hold a wafer is provided at an end of the arm. Further, the atmosphere robot 104 may horizontally move to the front of each of the load ports or turn to change the direction. The atmosphere robot 104 discharges an unprocessed wafer from the cassette disposed on the load ports 101, 102, and 103 or introduces a completely processed wafer.

The load lock 105 has a mechanism which holds the wafer therein and an openable gate valve is provided at a discharging exit of the wafer. When the gate valve is closed, the inside may be sealed and an inside pressure may be moved up and down between an atmospheric pressure and a vacuum pressure.

The vacuum robots 106 and 110 are disposed in a sealed container (conveyance chamber) and the inside of the container is maintained at a reduced pressure. In this container, a wafer discharging inlet, which is connected to the load lock 105, the intermediate chamber 109 or the processing chambers 107, 108, 111, and 112, is provided and the discharging inlet includes an openable gate valve. The vacuum robots 106 and 110 include extensible arms and a hand which may hold a wafer is provided at an end of each of the arms. Further, the vacuum robots 106 and 110 turn to change the direction. The vacuum robots 106 and 110 discharge or introduce the wafer from or in the load lock 105, the intermediate chamber 109, or the processing chambers 107, 108, 111, and 112.

The intermediate chamber 109 includes a mechanism which may hold the wafer therein and the inside thereof is maintained at a reduced pressure. The vacuum robots 106 and 110 dispose the wafer on the intermediate chamber 109 or remove the wafer from the intermediate chamber 109 so as to deliver the wafer between the vacuum robots. The processing chambers 107, 108, 111, and 112 have a function that performs the processing such as etching or film formation while holding the wafer in the processing chamber.

Further, a control part 113 has a function that controls to perform the conveying operation of the atmosphere robot 104 or the vacuum robots 106 and 110 or processings in the processing chambers 107, 108, 111, and 112. The control part 113 is configured by a computing unit which performs a computation processing and a storing unit which stores data and a program which describes a control procedure or data such as a status in the device is stored.

Figure 2A:
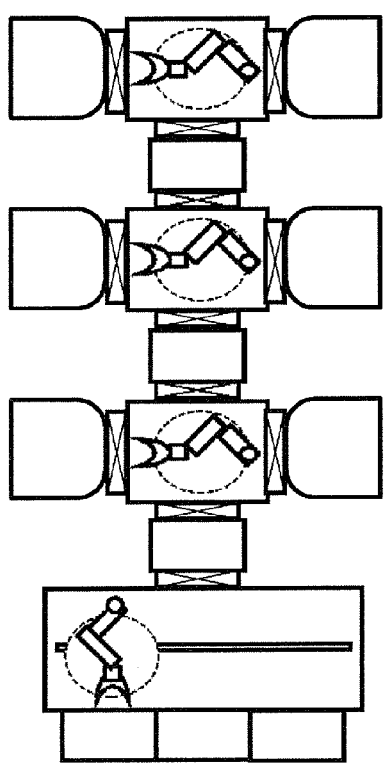
FIG. 2A is a view explaining example of the configuration of six processing chambers and three vacuum robots in the semiconductor processing device of the linear tool.
Figure 2B:
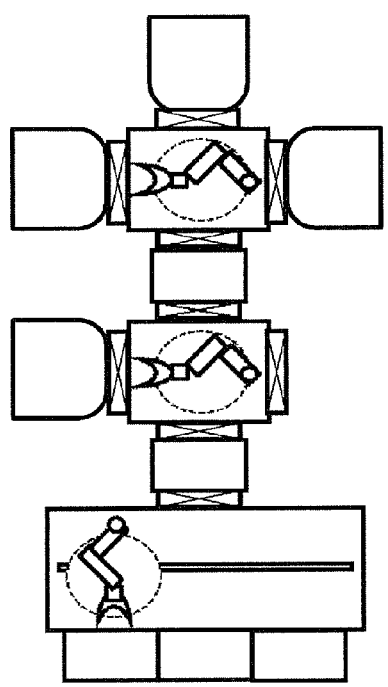
FIG. 2B is a view explaining example of the configuration of one or three processing chambers, which are connected to one vacuum robot, in the semiconductor processing device of the linear tool.

However, the configuration of the semiconductor processing device illustrated in FIG. 1 is an example, and specifically, the number of processing chambers in the mechanical part is not limited to four, the number of load ports is not limited to three, and the number of vacuum robots is not limited to two. FIG. 2 illustrates another example of the mechanical part of the semiconductor processing device. As illustrated in FIG. 2, the number of processing chambers may be six, the number of vacuum robots may be three, and the number of processing chambers, which are connected to one vacuum robot, may be one or three.

Figure 3:
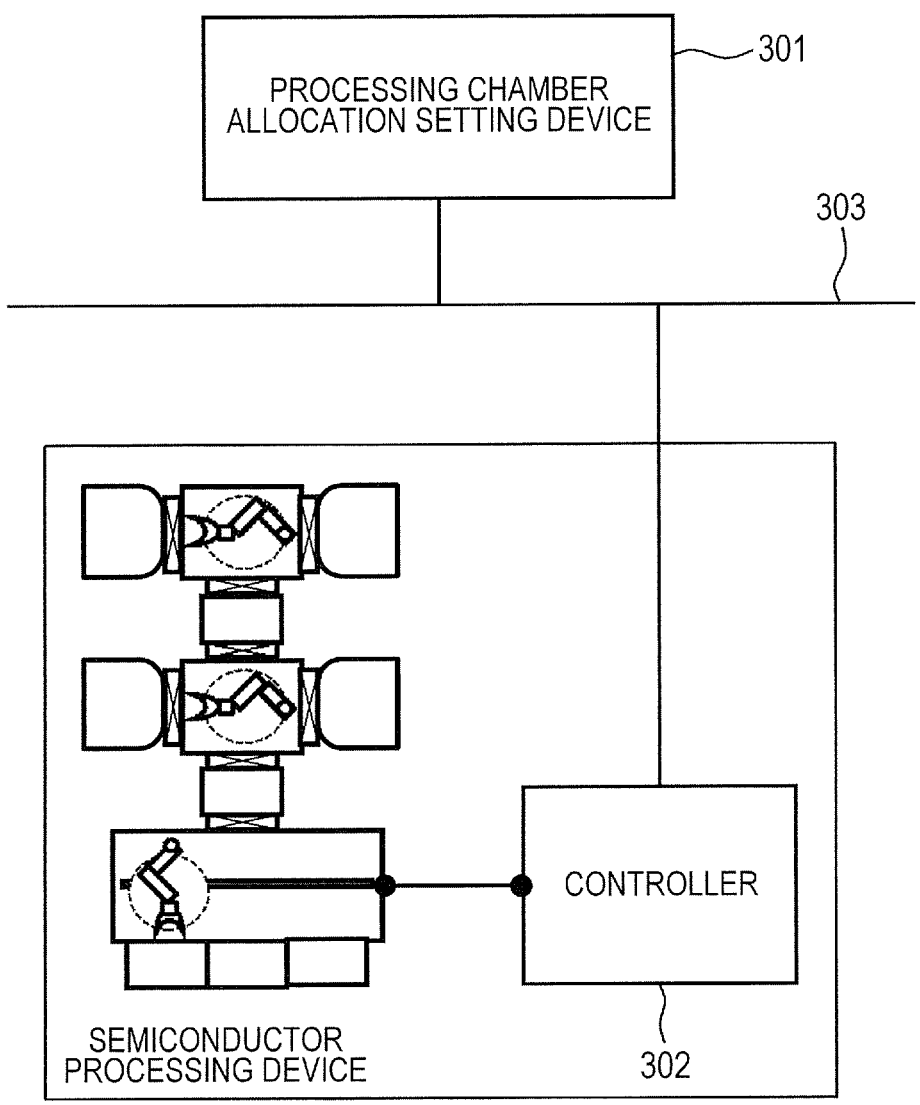
FIG. 3 is a view explaining a relationship between a processing chamber allocation setting device and a semiconductor processing device.

FIG. 3 explains a relationship between the processing chamber allocation setting device and the semiconductor processing device of the present invention. A processing chamber allocation setting device 301 and a semiconductor processing device 302 are connected to each other through a network 303 and data may be exchanged therebetween. Processing chamber allocation information which is adopted by a user, among processing chamber allocation candidates which may increase the productivity to the most, which are calculated based on the simulation in the processing chamber allocation setting device 301 and the operation schedule information of the semiconductor processing device in the processing chamber allocation are transferred to the semiconductor processing device 302 and the semiconductor processing device 302 conveys the wafer or performs processings based on the information. In the meantime, available processing chamber information of the semiconductor processing device 302 which is required for the allocation of the processing chamber and the operation control rule information which is unique in the semiconductor processing device are transferred from the semiconductor processing device 302 to the processing chamber allocation setting device 301 and the processing chamber allocation setting device 301 determines the processing chamber allocation based on the information.

Figure 4:
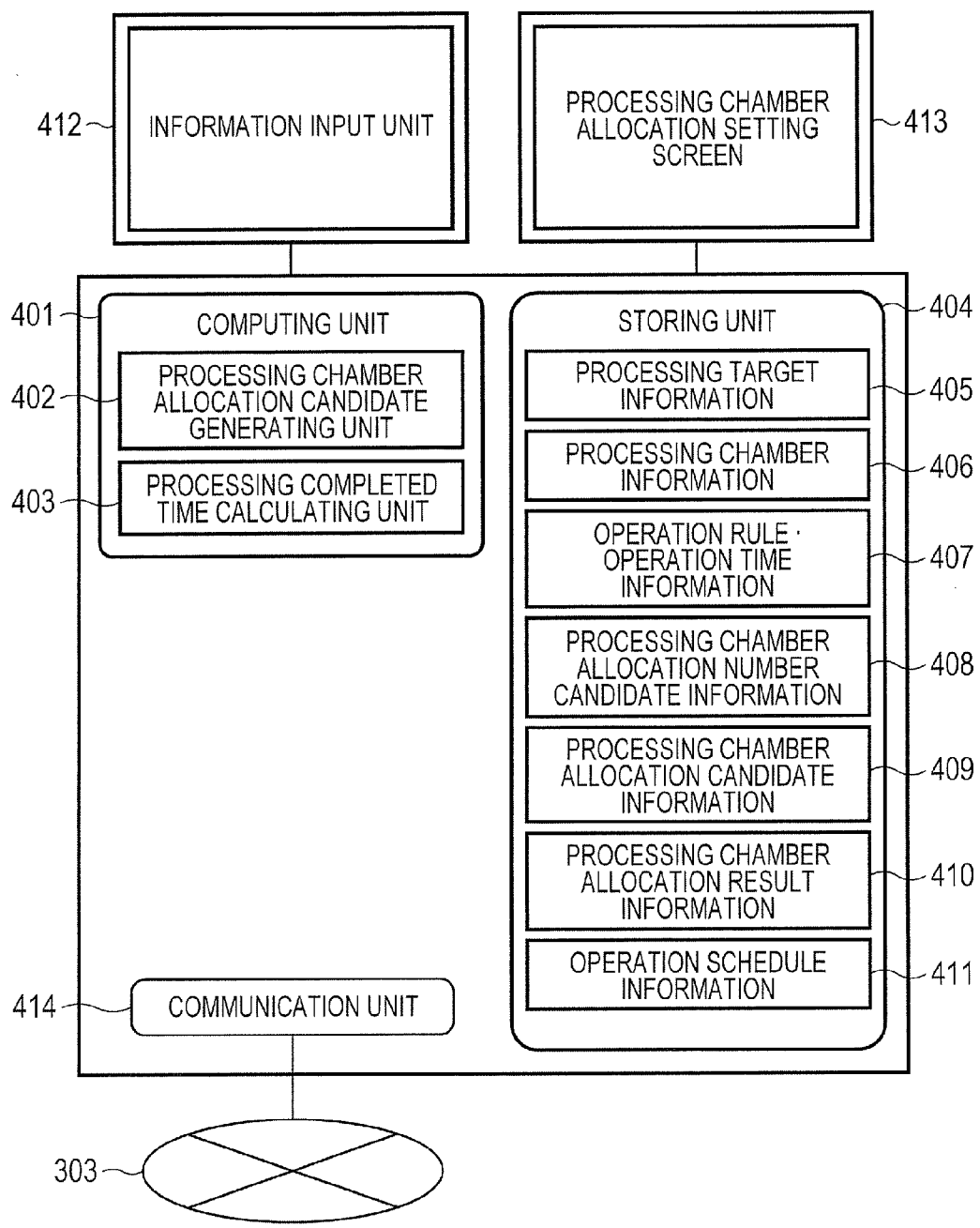
FIG. 4 is a view explaining a configuration of a processing chamber allocation setting device.

FIG. 4 explains a configuration of the processing chamber allocation setting device 301 of the present invention. The processing chamber allocation setting device 301 mainly includes a computing unit 401, a storing unit 404, an information input unit 412, a processing chamber allocation setting screen 413, and a communication unit 414. The computing unit 401, the storing unit 404, and the communication unit 414 are disposed on a calculator which may perform the computation processing or store the data. The computer is connected with the information input unit 412 such as a keyboard or a mouse and the processing chamber allocation setting screen 413 such as a display and the information input from the information input unit 412 and information received from the semiconductor processing device 302 through the network 303 and the communication unit 414 are stored in the storing unit 404. In the meantime, information 410 regarding the processing chamber allocation result, which is stored in the storing unit 404, may be displayed on the processing chamber allocation setting screen 413. Further, the processing chamber allocation information and the operation schedule information are output to the semiconductor processing device 302 through the communication unit 414.

The computing unit 401 includes two processing units, that is, a processing chamber allocation candidate generating unit 402 which generates a candidate of the processing chamber allocation and a processing completed time calculating unit 403 which calculates the processing completed time for the candidate of the processing chamber allocation.

Further, in the storing unit 404, processing target information 405, processing chamber information 406, operation rule and operation time information 407, processing chamber allocation number candidate information 408, processing chamber allocation candidate information 409, processing chamber allocation result information 410 are stored.

Figure 5:
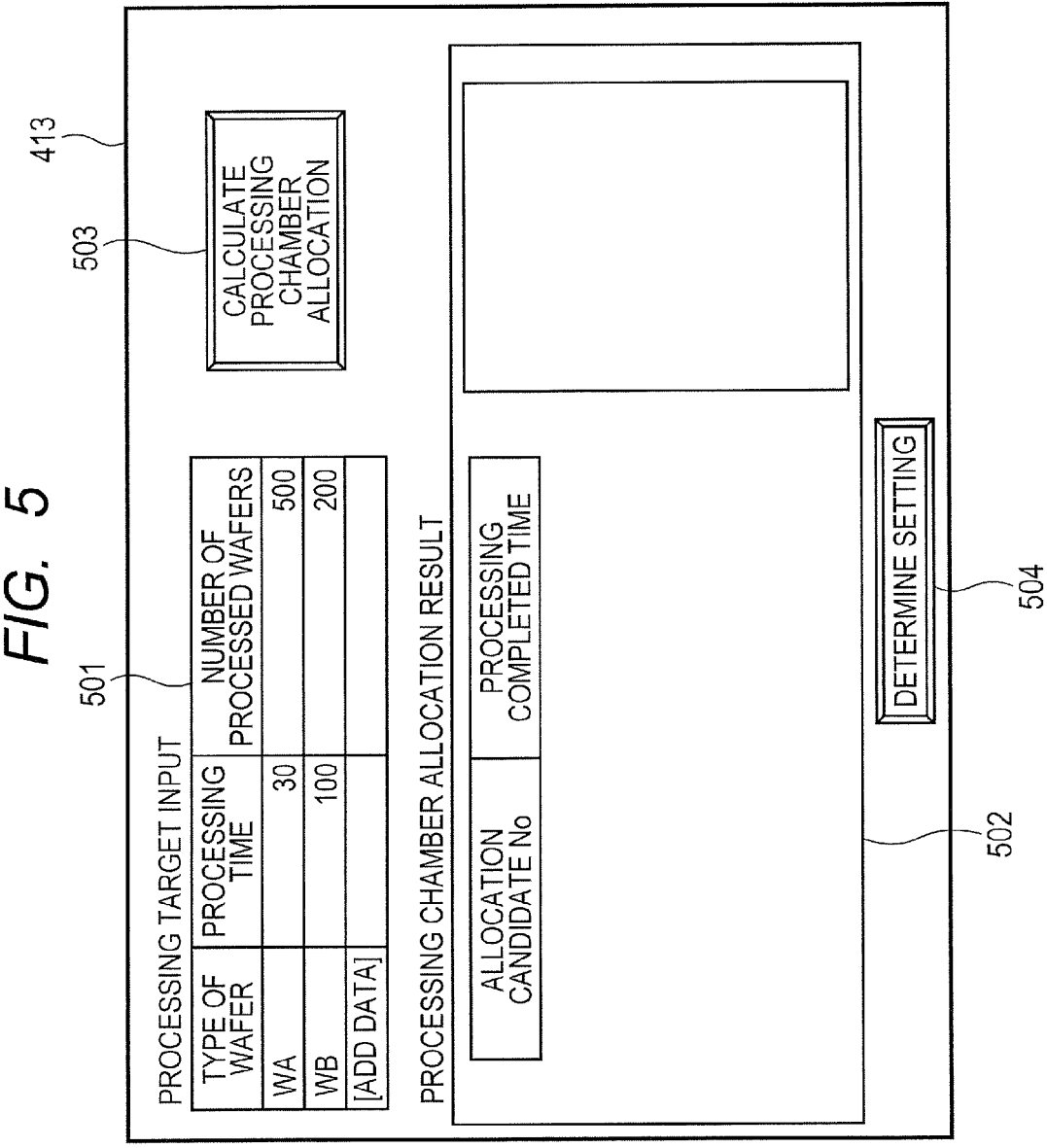
FIG. 5 is a view explaining a processing chamber allocation setting screen.

FIG. 5 is a view explaining the processing chamber allocation setting screen 413. The processing chamber allocation setting screen 413 includes a processing target input unit 501, a processing chamber allocation result display unit 502, a processing chamber allocation calculation performing button 503 for starting to calculate the processing chamber allocation, and a processing chamber allocation setting determining button 504 for determining the setting of the processing allocation. The processing target input unit 501 is an area where the user inputs a type of wafer to be processed, a processing time, and the number of processed wafers. A display example illustrated in FIG. 5 is an example in which data indicating that a type of wafer is WA, a processing time is 30, and the number of processed wafers is 500 sheets and data indicating that a type of wafer is WB, a processing time is 100, and the number of processed wafer is 200 sheets are input. The processing chamber allocation result display unit 502 is a part which displays a result of calculating the processing chamber allocation. Since the example of FIG. 5 is in a state before calculating the processing chamber allocation, the processing chamber allocation result display unit 502 is left in a blank. The processing chamber allocation calculation performing button 503 is a button which allows a person who determines the processing chamber allocation to input data to be processed and then calculate the processing chamber allocation. If this button is pressed, the processing chamber allocation starts to be calculated in the processing chamber allocation setting device 301.

The processing target information 405 is information which is stored in the storing unit 404 by receiving data input by the user from the processing target input unit 501 of the processing chamber allocation setting screen 413. As illustrated in FIG. 11, the processing target information 405 is configured by a data table having data items of the type of wafer, the processed time, and the number of processed wafers.

The processing chamber information 406 is information which is stored in the storing unit 404 by receiving processing chamber information of the target semiconductor processing device 302 through the network 303. As illustrated in FIG. 12, the processing chamber information 406 is a data table formed by data items of processing chamber IDs. Wafer type information in the processing target information 405 received from the user is transferred to the semiconductor processing device 302 to receive processing chamber information that selects a processing chamber in which the type of wafer may be processed and a processing chamber which is not stopped for the purpose of the maintenance, from the semiconductor processing device 302, to be stored in the storing unit 404.

The operation rule and operation time information 407 is information indicating a condition, which starts to perform the operation such as an opening and closing operation of the gate valve of the mechanism which conveys the wafer, such as the atmosphere robot or the vacuum robot included in the target semiconductor processing device 302, the load lock, the intermediate chamber, and the processing chamber, and an operating time thereof. As illustrated in FIG. 13, the operation rule and operation time information 407 is configured by a data table having data items of an operating part, operating contents, an operation performing condition, and an operating time. For example, if there is a plurality of targets to be grasped by the robot at one time or if there is a plurality of available processing chambers which processes the wafer, since a rule indicating which one has a priority is determined as a unique operation control rule for every target semiconductor processing device 302 and is required for the simulation processing which will be described below, the rule is received in advance from the target semiconductor processing device 302 as the operation rule and operation time information to be stored in the storing unit 404.

The processing chamber allocation number candidate information 408 is created in the processing chamber allocation candidate generating unit 402 and is information of all combinations of the number of processing chambers for allocating the number of available processing chambers included in the target semiconductor processing device to every type of wafer input by the user. As illustrated in FIG. 14, the processing chamber allocation number candidate information 408 is configured by a data table having data items of an allocation number candidate No., the type of wafer, and the number of allocated processing chambers.

Figures 15A, 15B:
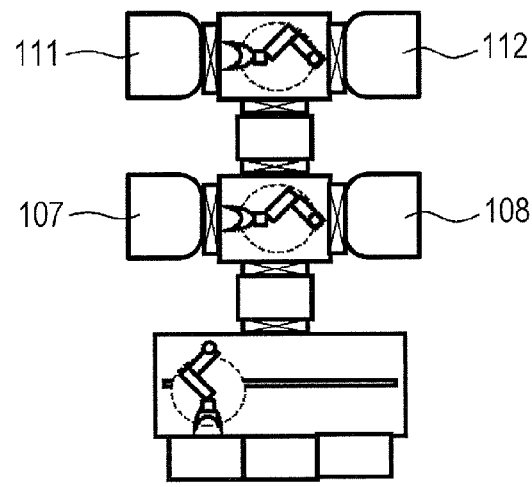
FIG. 15A is a view explaining example of the configuration of the semiconductor processing device of the linear tool.
FIG. 15B is a view illustrating an example of processing chamber allocation candidate information which is allocated to the configuration of FIG. 15A.

The processing chamber allocation candidate information 409 is created in the processing chamber allocation candidate generating unit 402 and retains all available candidates of combination of the processing chambers and the type of allocated wafer. As illustrated in FIG. 15B, the processing chamber allocation candidate information 409 is configured by a data table having data items of the processing chamber allocation candidate No. and a type of wafer which is allocated to each of available processing devices.

The processing chamber allocation result information 410 records the processing completed time which is a result of performing a simulation on a processing of the processing target for every processing chamber allocation candidate in the processing completed time calculating unit 403. As illustrated in FIG. 16, the processing chamber allocation result information 410 is configured by a data table having data items of the processing allocation candidate No. and the processing completed time.

The operation schedule information 411 retains a result of calculating an operation schedule of the atmosphere robot, the vacuum robot, the load lock, and the processing chamber of the semiconductor processing device, based on the processing chamber allocation selected by the user, among one or more processing chamber allocation candidates which are evaluated to have the highest productivity in the processing chamber allocation setting device of the present invention and displayed in the descending order. As illustrated in FIG. 18, the operation schedule information 411 is configured by a data table having data items of a part, an operation, and a starting time.

Figure 6:
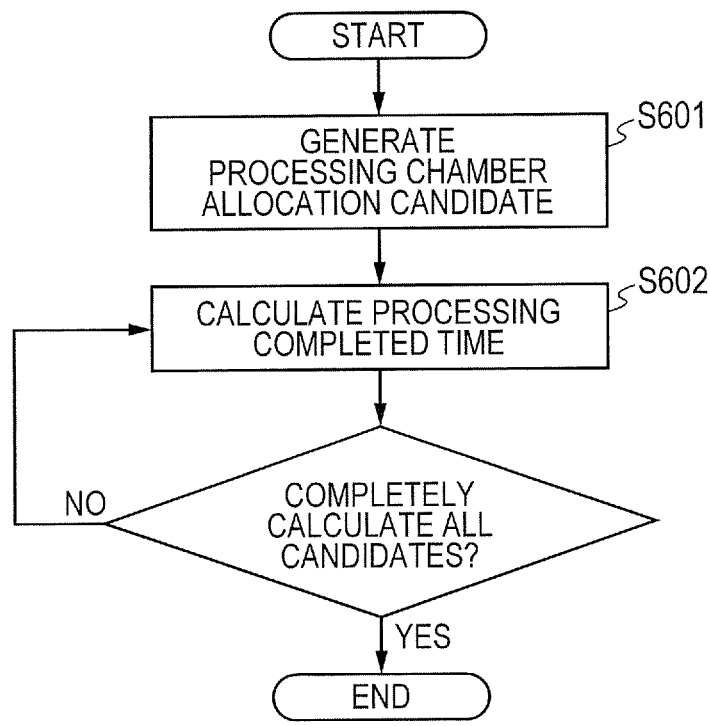
FIG. 6 is a view explaining a flowchart of a processing chamber allocation calculation processing.

FIG. 6 is a view explaining a flowchart of the processing chamber allocation calculation processing which is performed in the processing chamber allocation setting device 301 of the present invention. The processing chamber allocation calculation processing is configured by a processing chamber allocation candidate generation processing 601 and a processing completed time calculation processing 602. Since the processing completed time is calculated for all of the plurality of processing chamber allocation candidates generated in the processing chamber allocation candidate generation processing 601 in the processing completed time calculation processing 602, the processing completed time calculation processing 602 is repeated until the calculation for all candidates is completed. When the processing completed time for all candidates is calculated, the processing chamber allocation calculation ends. The result of the processing chamber allocation calculation is displayed on the processing chamber allocation result display unit 502 of the processing chamber allocation setting screen 413.

Figure 7:
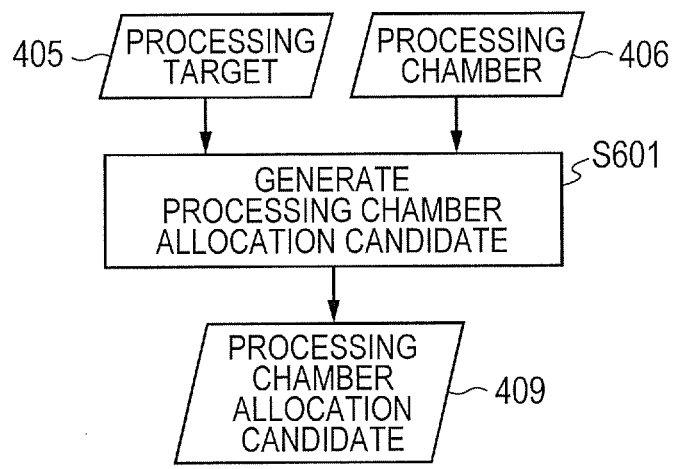
FIG. 7 is a view explaining data input and output of a processing chamber allocation candidate generation processing.

FIG. 7 is a view illustrating data input and output of the processing chamber allocation candidate generation processing 601. In the processing chamber allocation candidate generation processing 601, the processing target information 405 and the processing chamber information 406 are input and the processing chamber allocation candidate information 409 is output. The processing target information 405 is a value which is input to the processing target input unit 501 of the processing chamber allocation setting screen 413 by a person who determines the processing chamber allocation using the information input unit 412. Further, the processing chamber information 406 indicates an available processing chamber in the semiconductor processing device 302 and is transmitted from the semiconductor processing device through the network.

Figure 17:
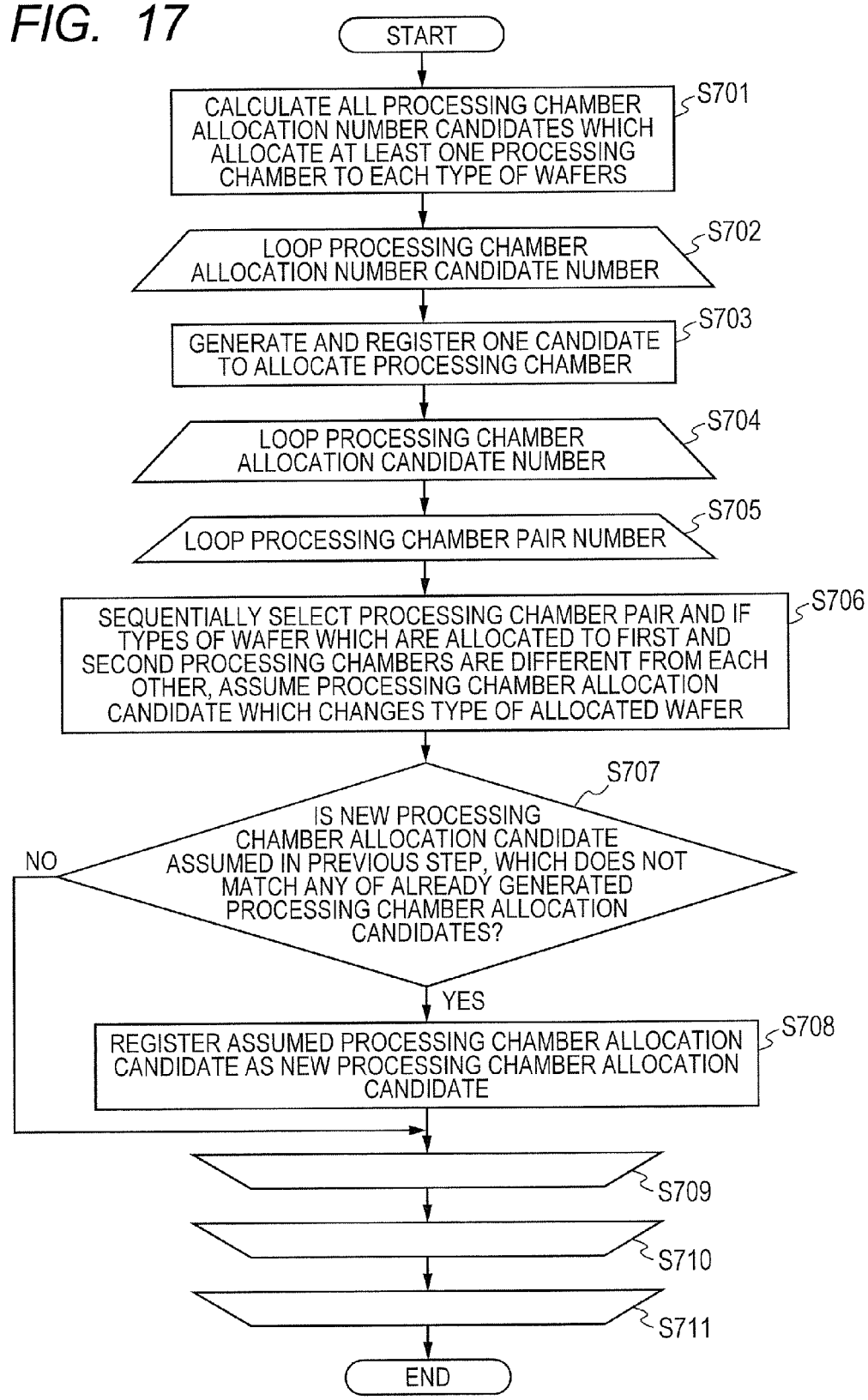
FIG. 17 is a flowchart explaining a calculation procedure which calculates processing chamber allocation candidate information.

A calculation procedure of calculating the processing chamber allocation candidate information 409 from the processing target information 405 and the processing chamber information 406 will be described with reference to the flowchart of FIG. 17.

First, a candidate of the number of processing chambers to be allocated for every type of wafer retained in the processing target information is calculated. Here, it is premised that a wafer of each type of the wafers to be processed, which is input by the user, is processed in parallel in the evaluation target semiconductor processing device 302. A total number of processing chambers to be allocated is calculated from the processing chamber information 406. Next, since at least one processing chamber needs to be allocated to every type of wafer, the number of types of wafer is subtracted from the total number of processing chambers. The remaining thereof is considered as a residual allocation number. Next, all combinations of allocating the residual allocation number to each type of the wafers are calculated. In this case, some types of wafer may not be allocated from the residual allocation number. Finally, one is added to the calculated allocation number of the allocation residual number of each type of the wafers to calculate the processing chamber allocation number of each type of the wafers (S701).

An example of data illustrated in FIGS. 11 and 12 will be described. First, the total number of processing chambers is four. The number of types of wafer is two, that is, WA and WB so that two is subtracted from the total number of processing chambers, that is, four, and thus the allocation residual number is two. Since the type of wafer to which the allocation residual number is allocated is two, the combination of allocating the allocation residual number is (WA=2, WB=0), (WA=1, WB=1), and (WA=0, WB=2). If one is added to the allocation number, (WA=3, WB=1), (WA=2, WB=2), and (WA=1, WB=3) are obtained. The above combinations are processing chamber allocation number candidates. The combinations are stored in the storing unit 404 as information illustrated in FIG. 14.

Next, it is calculated whether to allocate which type of wafer to which processing chamber.

One processing chamber allocation number candidate is selected (S702), a one type of wafer among them is selected, and the processing chamber is allocated from the unallocated processing chambers based on the allocation number of the type of wafer until the allocation number of the type of wafer is satisfied.

The allocation of the processing chamber is repeated until the allocation of the processing chamber for all types of wafers is determined. One processing chamber allocation candidate is generated for the processing chamber allocation number candidate selected as described above and then registered in the storing unit (S703).

An example illustrated in FIG. 14 will be described. First, a processing chamber allocation number candidate No. 1 is selected. If a wafer type WA is selected, the processing chamber allocation number is three. In this case, since the unallocated processing chambers are the processing chambers 107, 108, 111, and 112, for example, the processing chambers 107, 108, and 111 are allocated to the wafer type WA in accordance with an order of the processing chamber ID. Next, since the processing chamber allocation for the wafer type WB is 1, the unallocated processing chamber 112 is allocated to the wafer type WB. By doing this, one processing chamber allocation candidate in which the processing chambers 107, 108, and 111 are allocated to the wafer type WA and the processing chamber 112 is allocated to the wafer type WB is generated (S703).

Next, an arbitrary pair of processing chambers (a pair number is sequentially applied) is selected for the one generated processing chamber allocation candidate and if the wafer type which is allocated to a first processing chamber is different from the wafer type which is allocated to a second processing chamber, the wafer type which is allocated to the first processing chamber is replaced with the wafer type which is allocated to the second processing chamber. By doing this, another processing chamber allocation candidate is further assumed (S706).

If a new processing chamber allocation candidate is assumed in the previous step S706 and the new processing chamber allocation candidate does not match any of the already registered processing chamber allocation candidates (S707), the processing chamber allocation candidate is registered in the storing unit as a new processing chamber allocation candidate (S708).

The above operations S706 to S708 are repeated until all pairs of processing chambers are selected (S705 to S709).

Further, if there is a newly generated processing chamber allocation candidate, the same operation is also repeated for the processing chamber allocation candidate (S704 to S710). By doing this, since it is considered that the processing chamber allocation candidates are generated for the selected processing chamber allocation number candidates, the above operations are performed on all processing chamber allocation number candidates (S702 to S711) to comprehensively generate all processing chamber allocation candidates.

An example of the processing chamber allocation number candidate No. 1 of FIG. 14 will be described. The description will be made continuously with the above description that one processing chamber allocation candidate in which the processing chambers 107, 108, and 111 are allocated to the wafer type WA and the processing chamber 112 is allocated to the wafer type WB is generated. Generated processing chamber allocation candidate data is registered in the processing chamber allocation candidate information table 409 of the storing unit 404 (S703). The generated processing chamber allocation candidate data is registered as a first record 1501 of the processing chamber allocation candidate information table 409 illustrated in FIG. 15B. It is searched whether a different solution for the processing chamber allocation candidate No. 1-1 is present, by replacing the wafer type which is allocated to the arbitrary pair of processing chambers. First, the arbitrary pair of processing chambers is selected. The processing chamber 107 and the processing chamber 108 are selected. Since the same wafer type WA is allocated to the processing chambers 107 and 108, no new processing chamber allocation candidate is generated so that a separate pair of processing chambers is selected again. Here, a procedure of sequentially selecting a pair of processing chambers is determined in advance and a number is sequentially assigned to the pair of processing chambers so that all combinations are selected.

Next, it is considered that the pair of processing chambers 107 and 112 is selected. The wafer type WA is allocated to the processing chamber 107 and the wafer type WB is allocated to the processing chamber 112 so that the processing chamber allocation is replaced. That is, the wafer type WB is allocated to the processing chamber 107 and the wafer type WA is allocated to the processing chamber 112. By doing this, a processing chamber allocation candidate in which the wafer type WA is allocated to the processing chambers 108, 111, and 112 and the wafer type WB is allocated to the processing chamber 107 is generated. The generated processing chamber allocation candidate data is registered as a second record 1502 of the processing chamber allocation candidate information table 409 (S708).

By doing this, if all pairs of processing chambers are selected and a new processing chamber allocation candidate is generated, a processing chamber allocation candidate (a record 1503) in which the processing chambers 107, 111, and 112 are allocated to the wafer type WA and the processing chamber 108 is allocated to the wafer type WB and a processing chamber allocation candidate (a record 1504) in which the processing chambers 107, 108, and 112 are allocated to the wafer type WA and the processing chamber 111 is allocated to the wafer type WB are generated.

Further, the same operation is performed even on newly generated processing chamber allocation candidates (processing chamber allocation candidates No. 1-2, No. 1-3, and No. 1-4) (S704 to S710). For example, if the same operation is performed on the processing chamber allocation candidate (the record 1502) in which the processing chambers 108, 111, and 112 are allocated to the wafer type WA and the processing chamber 107 is allocated to the wafer type WB, the processing chamber allocation candidate becomes equal to the already generated processing chamber allocation candidate (S707) so that a new processing chamber allocation candidate is not generated. Similarly, a new processing chamber allocation candidate is not generated for the processing chamber allocation candidate (the record 1503) in which the processing chambers 107, 111, and 112 are allocated to the wafer type WA and the processing chamber 108 is allocated to the wafer type WB and the processing chamber allocation candidate (the record 1504) in which the processing chambers 107, 108, and 112 are allocated to the wafer type WA and the processing chamber 111 is allocated to the wafer type WB. Accordingly, the processing chamber allocation candidate generation for the selected processing chamber allocation number candidate No. 1 ends. Thereafter, the operation is repeated until a processing chamber allocation candidate is generated for a new processing chamber allocation number candidate and the processing chamber allocation candidate generation for all processing chamber allocation number candidates is completed (S702 to S711).

For example, a processing of a loop is performed on the processing chamber allocation number candidate No. 2 (S702) and a processing chamber allocation candidate in which the processing chambers 107 and 108 are allocated to the wafer type WA and the processing chambers 111 and 112 are allocated to the wafer type WB is generated as one candidate of processing chamber allocation to be registered in the processing chamber allocation candidate information table 409 (S703). The registered processing chamber allocation candidate corresponds to a record 1505 of the processing chamber allocation candidate information table 409 illustrated in FIG. 15B. Continuously, a processing of a loop is performed on the processing chamber allocation candidate No. 2-1 registered in the previous step S703 (S704) and a pair of processing chambers is sequentially selected to assume a processing chamber allocation candidate in which the allocated wafer type is replaced (S706) and it is confirmed that the assumed processing chamber allocation candidate does not match any of the already generated processing chamber allocation candidates (S707) so that the processing chamber allocation candidates which are sequentially registered (S708) correspond to records 1506 to 1509 of the processing chamber allocation candidate information table 409 illustrated in FIG. 15B.

In the above-mentioned processing chamber allocation candidate generation processing S601, the processing chamber allocation candidate information 409 as illustrated in FIG. 15B is generated. This information retains the combination of the processing chambers and the allocated wafer type for every processing chamber allocation candidate.

Figure 8:
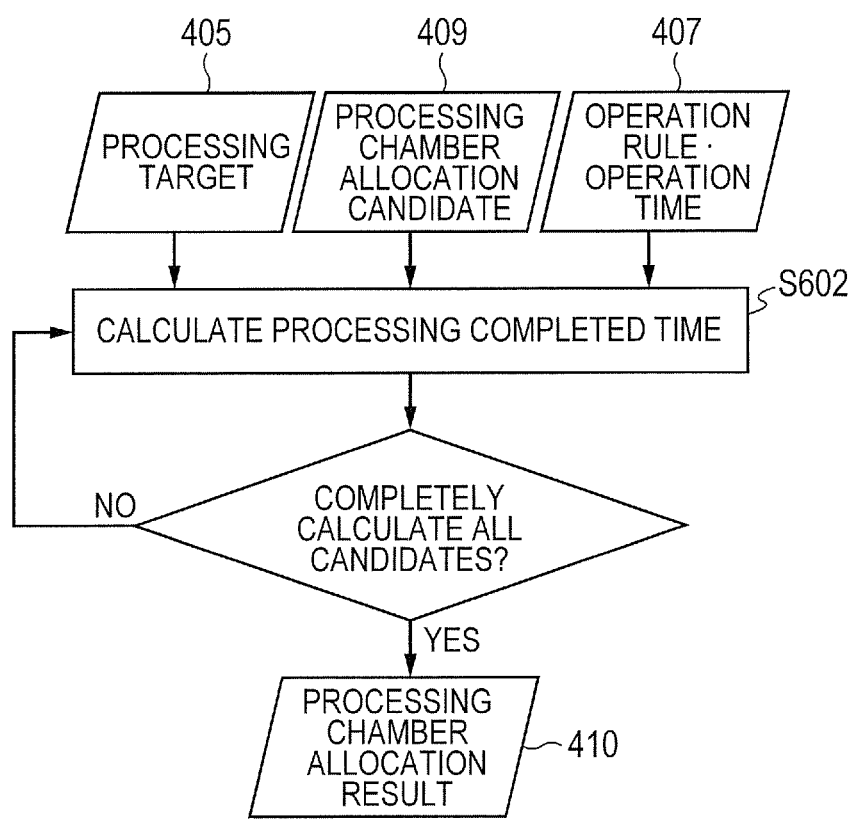
FIG. 8 is a view explaining data input and output of a processing completed time calculation processing.

FIG. 8 is a view explaining data input and output of a processing completed time calculation processing S602. In the processing completed time calculation processing S602, the processing target information 405, the processing chamber allocation candidate information 409, and the operation rule and operation time information 407 are input and the processing chamber allocation result information 410 is output.

The operation rule and operation time information 407 is information illustrated in FIG. 13, as described above. The operation rule and operation time information 407 is information indicating a condition in which the mechanism, which conveys the wafer, such as the atmosphere robot or the vacuum robot starts to perform the operation and the operation time. For example, data having operation contents of "convey wafer conveyed from the load ports 101, 102, and 103 to the load lock 105" recorded in a data record at a first row of the data table of FIG. 13 defines one operation that an unprocessed wafer is discharged from a load port of the atmosphere robot 104 and introduced into the load lock, "there is an unprocessed wafer for which a processing chamber allocated to the load ports 101, 102, and 103 is waiting", "the load lock 105 has an empty space and is in an atmospheric pressure status", and "the atmosphere robot is in a waiting status" are defined as a condition to start the above operation, which means that an operation time required from the starting of the operation to the completion of the operation is 5.

A processing procedure of the processing completed time calculation processing S602 will be described. The processing completed time calculation processing S602 is performed by using a computing procedure that virtually maintains a state of the semiconductor processing device called as a simulation on a calculator as data and arranges the operations of the device while a time elapses in the computer. First, based on the processing target information 405, a setting that unprocessed wafers as many as produced number are provided on the load port for every type of wafers is performed. In the example of FIG. 11, 500 sheets of unprocessed wafers of wafer type WA and 200 sheets of unprocessed wafers of wafer type WB are provided on the load port. Actually, even though the number of wafers which may be held on one load port is limited, in the embodiment, a wafer supplying method and timing are not specifically considered in order to simplify the simulation because the calculation is virtually performed.

Next, one candidate information is selected from the processing chamber allocation candidate information 409. From the candidate information, it is determined to which processing chamber the wafer of each wafer type is conveyed. For example, as illustrated in FIG. 15B, if the processing chamber allocation candidate No. 1-1 is selected, 500 sheets of wafers of wafer type WA are conveyed to any one of the processing chambers 107, 108, and 111 and 200 sheets of wafers of wafer type WB are conveyed to the processing chamber 112. If an initial status is set, when there is an operation which satisfies a condition in light of the operation performing condition of the atmosphere robot, the vacuum robot, and the load lock, based on the operation rule and operation time information 407, the operation is performed. If the operation is performed, after the operating time of the operation elapses, the position of the wafer or the operating status such as in the process of operation or in the waiting status is changed. Therefore, if there is an operation whose changed status satisfies the operation performing condition when the time elapses, the operation is performed. When the above procedures are repeated and the operations are arranged, a series of processings that the wafer is discharged from the load port in the unprocessed status, the processing is performed on the wafer in the processing chamber, and the wafer returns to the load port in the processing completed status are completed for each of the wafers. The above processings are repeated until processings on all wafers are completely performed and the wafers return to the load port.

Figure 9:
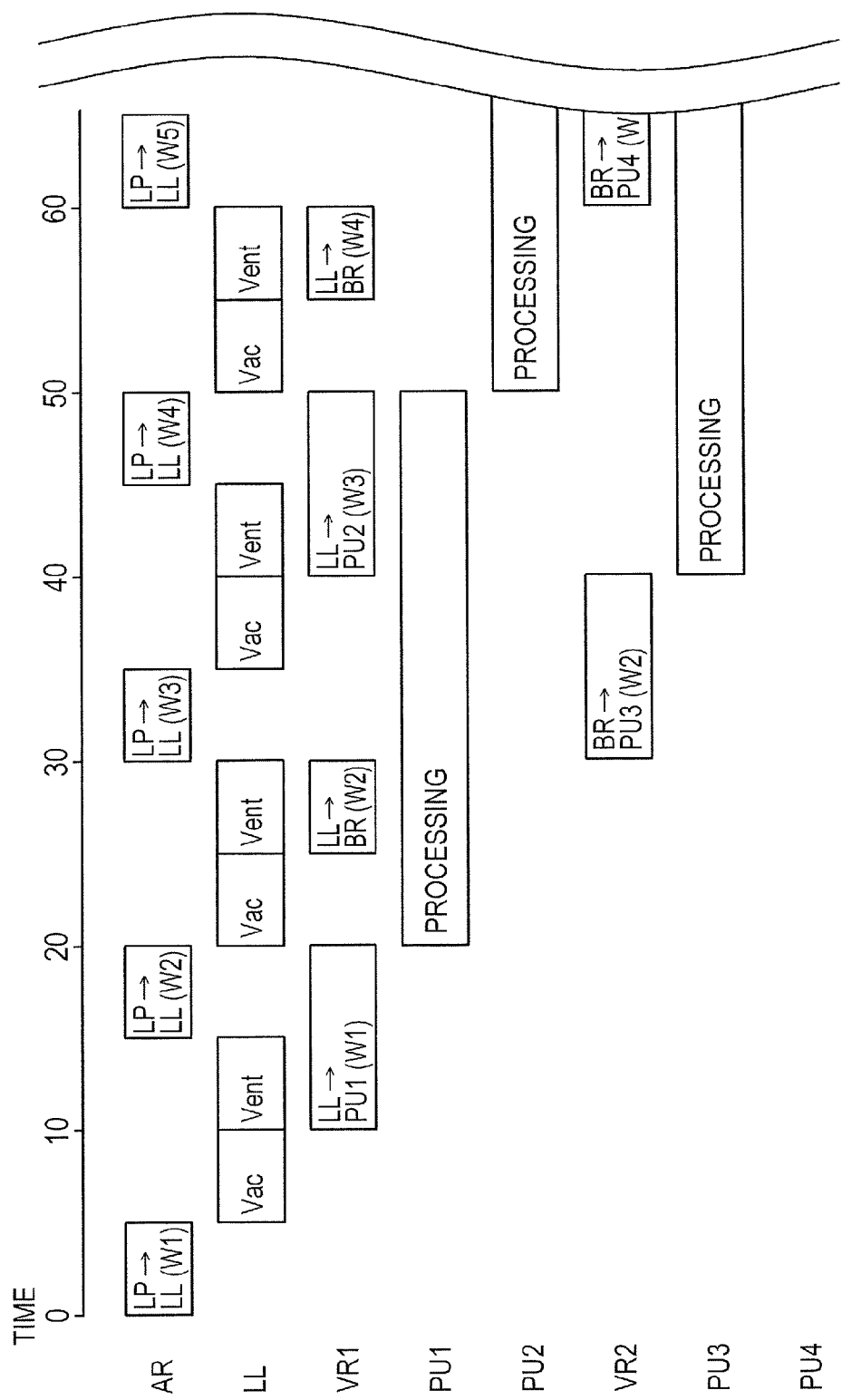
FIG. 9 is a view explaining a simulation procedure of the processing completed time calculation processing.

The above simulation procedure will be described with reference to FIG. 9. Abbreviations used in FIG. 9 are as follows: As the abbreviations of names of parts, AR is an atmosphere robot 104, LL is a load lock 105, VR1 is a vacuum robot 106, PU1 is a processing chamber 107, PU2 is a processing chamber 108, VR2 is a vacuum robot 110, PU3 is a processing chamber 111, PU4 is a processing chamber 112, LP is load ports 101, 102, and 103, and BR is an intermediate chamber 109. Further, W1, . . . , W5 refer to an ID of a wafer. As the notation of the operation of each of the parts, "part 1→part 2 (wafer ID)" indicates an operation that a wafer having the wafer ID is conveyed from the part 1 to the part 2. Further, Vac indicates a vacuum and Vent indicates vent, and processing indicates in the process of processing.

In the initial status where the time is zero, it is assumed that all unprocessed wafers are provided on the load port 101, all processing chambers 107, 108, 111, and 112, the atmosphere robot 104, and the vacuum robots 106 and 110 are in the waiting status, and the inside of the load lock 105 is empty in the atmospheric pressure status. Further, it is considered that wafers of the wafer type WA are conveyed to any one of the processing chambers 107, 108, and 111 and wafers of the wafer type WB are conveyed to the processing chamber 112.

First, in a state where the time is zero, a condition that "there is an unprocessed wafer for which the processing chamber allocated to the load ports 101, 102, and 103 is waiting", "the load lock 105 has an empty space and is in the atmospheric pressure status" and "the atmosphere robot 104 is in a waiting status" is established so that an operation of "conveying the wafer from the load ports 101, 102, and 103 to the load lock 105" is performed. In this case, since all processing chambers are in a waiting status, the wafer of the wafer type WA may be conveyed to any of the processing chambers 107, 108, and 111 and the wafer of the wafer type WB may be conveyed to the processing chamber 112. If a plurality of operation performing conditions is established for the same operation part, since a priority may be assigned in accordance with the operation control rule of the semiconductor processing device, the operation control rule needs to be followed. In other words, a rule which is created in a format of the operation rule and operation time information 407 based on the unique operation control rule of the semiconductor processing device in advance is input from the semiconductor processing device 302 through the network 303 to be stored in the storing unit 404.

In the example illustrated in FIG. 9, a wafer whose wafer ID is W1 is conveyed to the processing chamber 107. If the operation starts, the atmosphere robot 104 is changed into an operating status. By the change in status, since there is no further available operating condition, the time elapses. Since there is no available operating condition to progress the time to 1, the time is further progressed. Since the operation time when the wafer is conveyed from the load port 101 to the load lock 105 by the atmosphere robot 104 starting at time 0 is 5, when the time becomes 5, the wafer W1 is introduced in the load lock 105 and the atmosphere robot 104 is changed into a waiting status.

Here, in light of the available operating condition, a condition that "the load lock 105 has an unprocessed wafer and is in atmospheric pressure status" is established and an operation of vacuuming the load lock 105 starts. By doing this, the load lock 105 is changed into a vacuuming status. Thereafter, if the time is further progressed, the load lock 105 is completely vacuumed at a time when the time is 10 so that the load lock 105 is changed into a vacuum status. In this case, in light of the available operating condition, two operating condition of a condition of "the load lock 105 has an unprocessed wafer and is in a vacuum status" and a condition of "the load lock 105 has an unprocessed wafer which is allocated to the processing chambers 107 and 108 and is in a vacuum status", "the processing chambers 107 and 108 are in the waiting status" and "the vacuum robot is in the waiting status" are established. In this case, the former is an operating condition of the load lock 105 and the latter is an operating condition of the vacuum robot 106, which may be simultaneously performed. Therefore, the load lock 105 starts to vent from a time 10 and the vacuum robot 106 starts to convey the wafer W1 from the load lock 105 to the processing chamber 107. By doing this, the load lock 105 is changed into a venting status and the vacuum robot 106 is changed into an operating status.

Thereafter, when the time is progressed, the load lock 105 is completely vented at a time 15 and the status of the load lock 105 is changed into the atmospheric pressure status. By doing this, the atmosphere robot 104 starts to convey the unprocessed wafer W2 from the load port 101 to the load lock 105. The wafer W2 is considered to be conveyed to the processing chamber 111. Thereafter, at a time 20, the atmosphere robot 104 completely conveys the wafer W2 to the load lock 105 and the vacuum robot 106 completely conveys the wafer W1 to the processing chamber 107. By the status change at this time, from the time 20, the load lock 105 starts to be vacuumed and the processing chamber 107 starts to perform the processing.

By repeating the above procedures, a time when all wafers are completely processed and then returns to the load port is calculated. A time from the time 0 to the time calculated above becomes the processing completed time of the selected processing chamber allocation candidate. The above procedures are performed on all processing chamber allocation candidates, the processing completed times of all processing chamber allocation candidates are calculated, and the calculated processing completed times are stored as the processing chamber allocation result information 410. The processing chamber allocation result information 410 is information as illustrated in FIG. 16 and the processing completed time is maintained for every processing chamber allocation candidate.

Figure 10:
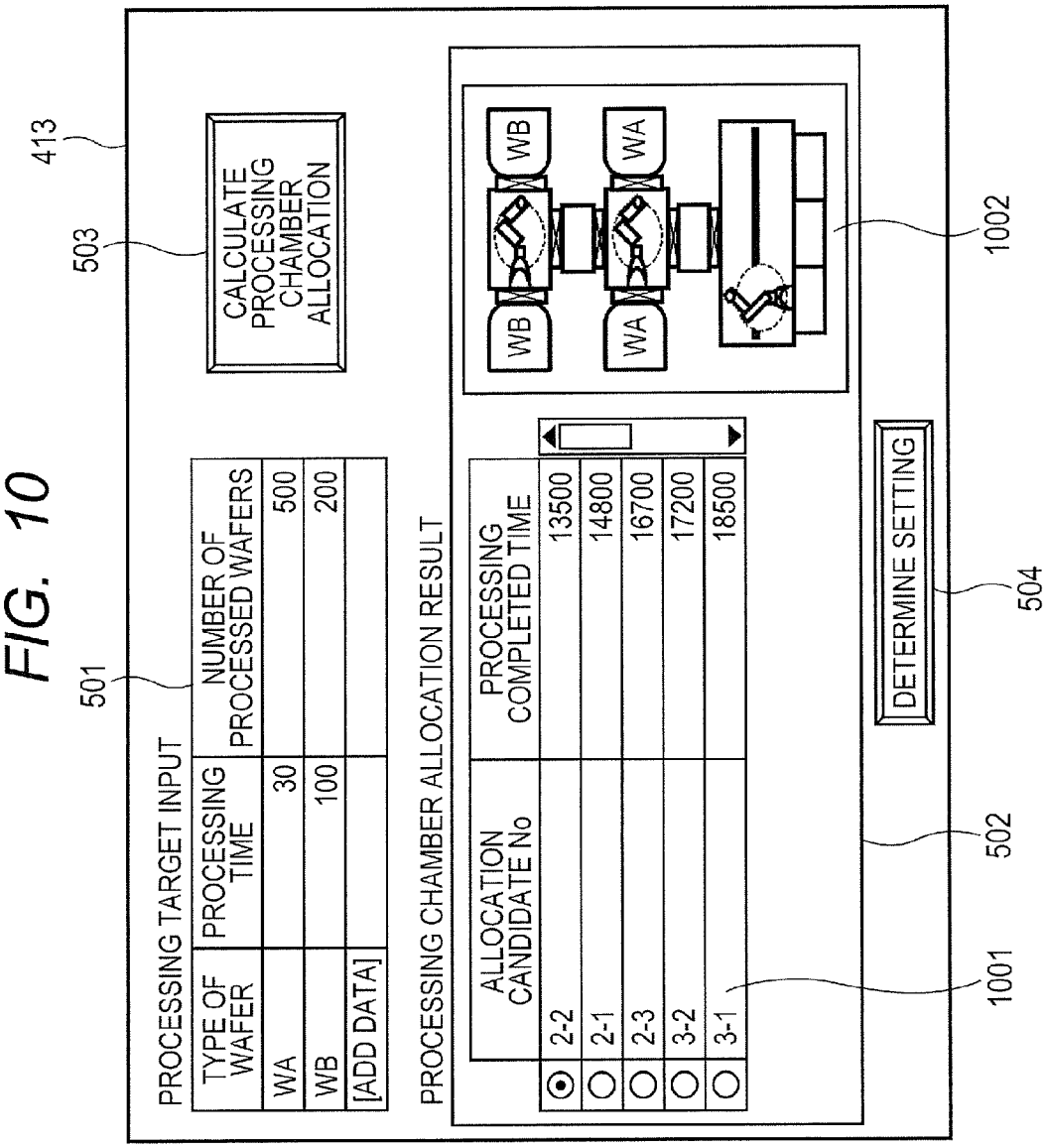
FIG. 10 is a view explaining display of a processing allocation result of the processing chamber allocation setting screen.

When the processing chamber allocation result information 410 is generated, the generated processing chamber allocation result information is displayed on the processing chamber allocation result display unit 502 of the processing chamber allocation setting screen 413. FIG. 10 illustrates an example that the processing chamber allocation result information is displayed. The processing chamber allocation result display unit 502 includes a result list display unit 1001 which displays a list of the processing chamber allocation candidates and the processing completed times and an allocation arrangement display unit 1002 which displays arrangement of the type of wafers of the processing chamber allocation candidate selected from the result list display unit 1001 and the allocated processing chambers. In the result list display unit 1001, the processing chamber allocation candidates are arranged to be displayed in the descending order from the earlier processing completed time. In the allocation arrangement display unit 1002, a layout of the semiconductor processing device is displayed and the type of wafers which are allocated to the processing chambers is displayed. Further, the type of wafers displayed on each of the processing chambers is designated by a person who determines the processing chamber allocation so that only the processing chamber allocation candidate in which the type of wafer allocated to the processing chamber is a designated type of wafer is displayed on the result list display unit 1001.

Here, the user selects a desired processing chamber from the processing chamber allocation candidate and presses the processing chamber allocation setting determining button 504. If the processing chamber allocation setting determining button 504 is pressed, the processing completed time calculation processing 602 is performed with the selected processing chamber allocation as an input. In this processing, in accordance with the selected processing chamber allocation, all wafers to be processed are conveyed to the corresponding processing chamber so that a series of manufacturing processes that perform a predetermined processing are simulated again. By doing this, the operation schedule of the atmosphere robot, the vacuum robot, the load lock, and the processing chamber as illustrated in FIG. 9 is calculated and the operation schedule information 411 as illustrated in FIG. 18 is generated. The operation schedule information 411 and the processing chamber allocation selected by the user are transmitted to the semiconductor processing device. The semiconductor processing device performs the operation based on the received operation schedule information 411 and the processing chamber allocation.

What is claimed is:

1. A processing chamber allocation setting device which evaluates allocation of processing chambers for a plurality of types of objects to be processed in advance in a semiconductor processing device having a structure in which a plurality of conveyance chambers is provided and the conveyance chambers are connected to the processing chambers while being connected to each other directly or with a delivery intermediate chamber of the object to be processed interposed therebetween, the device comprising:

a processing chamber allocation candidate generating unit which is configured to calculate all processing chamber allocation number candidates which allocates at least one processing chamber to each one of the plurality of types of objects to be processed, create one processing chamber allocation candidate which allocates the each one of the plurality of types of objects to be processed to each of the processing chambers for each of the calculated processing chamber allocation number candidates, and in an arbitrary pair of the processing chambers of the one processing chamber allocation candidate for which each processing chamber of the arbitrary pair is allocated to a different type of object, replace the types of allocated objects to be processed among the arbitrary pair of processing chambers for the one processing chambers in order to search a new processing chamber allocation candidate to generate all combinations of processing chamber allocation candidates, and a processing completed time calculating unit which is configured to virtually reproduce a plurality of a series of manufacturing processes, each of which conveys one of the processing targets designated by a user in accordance with each of the processing chamber allocation candidates from a load port where the processing target is stored to a corresponding processing chamber of the semiconductor processing device to perform a predetermined processing and thereafter to return the processing target from the corresponding processing chamber to the load port, on a calculator, to calculate a processing completed time from an initial processing starting time of all objects to be processed, which are processing targets, to a processing completed time of the last object to be processed for every processing chamber allocation candidate.

2. The processing chamber allocation setting device according to claim 1, further comprising:

a computing unit, a storing unit, an information input unit, a display unit, and a communication unit, wherein the computing unit includes the processing chamber allocation candidate generating unit and the processing completed time calculating unit, and the processing completed time calculating unit displays a calculated processing completed time for every processing chamber allocation candidate on the display unit in a descending order from the most quickly completed candidate to allow the user to receive the processing chamber allocation candidate selected through the information input unit, simulates the series of manufacturing processes of all objects to be processed, which are processing targets, again in accordance with the selected processing chamber allocation candidate to create operation schedule information of a target semiconductor processing device to transmit the selected processing chamber allocation and the operation schedule information to the semiconductor processing device through the communication unit.

3. The processing chamber allocation setting device according to claim 2, wherein the storing unit stores processing target information input from the information input unit by a user, processing chamber information which is notified by a target semiconductor processing device to specify a processing chamber which processes an object to be processed among the processing chambers included in the target semiconductor processing device, operation rule and operation time information which is notified by the semiconductor processing device and includes a condition that starts to perform the operation of the operating parts included in the semiconductor processing device, an operation time of the operating parts, and an operation control rule which assigns a priority for a plurality of available operations, processing chamber allocation number candidate information which is all combination information of the number of processing chambers which are allocated to every type of object to be processed which is a processing target, processing chamber allocation candidate information which retains all available candidates of combination of the processing chambers and the type of allocated objects to be processed, processing chamber allocation result information which records the processing completed time which is a result of simulating a series of manufacturing processes of the processing target for every processing chamber allocation candidate, and operation schedule information which calculates an operation schedule of each operation part of the semiconductor processing device based on the processing chamber allocation selected by the user.

4. The processing chamber allocation setting device according to claim 3, wherein the operation rule and operation time information of the storing unit is stored in a data table having at least data items of an operating part, operating contents, an operating condition, and an operating time, and the processing completed time calculating unit starts a simulation of a series of manufacturing processes under the assumption that all objects to be processed of the processing target information are present in a load port of the semiconductor processing device for every processing chamber allocation candidate, progresses a time in the unit of time to start an operation at a time when the operating part of the semiconductor processing device satisfies the operating condition, conveys the object to be processed to the processing chamber to perform a predetermined processing, calculates a processing completed time until all objects to be processed are collected in the load port, and displays the processing completed times in the processing chamber allocation candidates on the display unit in the descending order from the earliest processing completed time.

5. The processing chamber allocation setting device according to claim 4, wherein the processing completed time calculating unit displays a layout chart of a processing chamber of the semiconductor processing device on a display unit to display information on a type of object to be processed, which is allocated to each of the processing chambers as a result of the selection of a user from a list of a processing completed time of the processing chamber allocation candidate, on a chart of a corresponding processing chamber, and allows a user to designate and input information on a type of object to be processed, which a user wants to allocate, on a chart of the processing chamber, to select only a combination of all processing chamber allocation candidates specified to allocate the processing chamber designated by the user and the type of object to be processed and the processing completed time to display the selected processing chamber allocation candidate in a descending order from the earliest processing completed time.

6. The processing chamber allocation setting device according to claim 1, wherein the processing chamber allocation candidate generating unit calculates all processing chamber allocation number candidates which allocate at least one processing chamber of the target semiconductor processing device to each type of objects to be processed, creates one processing chamber allocation candidate which allocates a type of object to be processed to each of the processing chambers in the processing chamber allocation number candidate, replaces the type of allocation object to be processed of an arbitrary pair of processing chambers for the one processing chamber allocation candidate to search a new processing chamber allocation candidate by changing to register the new processing chamber allocation candidate to repeat searching for all pairs of processing chambers and all processing chamber allocation number candidates to generate all combinations of processing chamber allocation candidates if a new processing chamber allocation candidate is found.

7. A processing chamber allocation setting program which, in order to evaluate allocation of processing chambers and a plurality of types of objects to be processed, in advance, in a semiconductor processing device having a structure in which a plurality of conveyance chambers is provided and the conveyance chambers are connected to the processing chambers while being connected to each other directly or with a delivery intermediate chamber of the object to be processed interposed therebetween, allows a computer to function as:

a unit which calculates all processing chamber allocation number candidates which allocates at least one processing chamber to each one of the plurality of types of objects to be processed based on processing target information input by a user and processible processing chamber information received from the semiconductor processing device, a unit which, in each of the processing chamber allocation number candidates, creates one processing chamber allocation candidate which allocates the each one of the plurality of types of objects to be processed to each of the processing chambers for each of the calculated processing chamber allocation number candidates, and in an arbitrary pair of the processing chambers of the one processing chamber allocation candidate for which each processing chamber of the arbitrary pair is allocated to a different type of object, replaces the types of allocated objects to be processed among the arbitrary pair of processing chambers in order to search a new processing chamber allocation candidate to generate all combinations of processing chamber allocation candidates; and a unit which uses operation rule and operation time information received from the semiconductor processing device to virtually reproduce a plurality of a series of manufacturing processes, each of which conveys one of the processing target designated by a user in accordance with each of the processing chamber allocation candidates from a load port where the processing target is stored to a corresponding processing chamber of the semiconductor processing device to perform a predetermined processing and thereafter to return the processing target from the corresponding processing chamber to the load port, on a calculator to calculate a processing completed time from an initial processing starting time of all objects to be processed, which are processing targets, to a processing completed time of the last object to be processed for every processing chamber allocation candidate.

8. The processing chamber allocation setting program according to claim 7, further allowing the computer to function as:
   a unit which displays the calculated processing completed time for every processing chamber allocation candidate in the descending order from the earliest completed candidate on a display unit to receive the processing chamber allocation candidate selected by the user through the information input unit;
   a unit which simulates the series of manufacturing processes of all objects to be processed which are processing targets, again in accordance with the selected processing chamber allocation candidate to create operation schedule information of the target semiconductor processing; and
   a unit which transmits the selected processing chamber allocation and the operation schedule information to the semiconductor processing device through a communication unit.

9. The processing chamber allocation setting program according to claim 7, further allowing the computer to function as:
   a unit which displays a layout chart of a processing chamber of the semiconductor processing device on a display unit to display information on a type of object to be processed, which is allocated to each of the processing chambers as a result of the selection of a user from a list of a processing completed time of the processing chamber allocation candidate, on a chart of a corresponding processing chamber, and
   a unit which allows a user to designate and input information on a type of object to be processed, which a user wants to allocate, on a chart of the processing chamber, to select only a combination of all processing chamber allocation candidates specified to allocate the processing chamber designated by the user and the type of object to be processed and the processing completed time to display the selected processing chamber allocation candidates in a descending order from the earliest processing completed time.

* * * * *